(12) United States Patent
Forrester et al.

(10) Patent No.: US 10,595,282 B2
(45) Date of Patent: Mar. 17, 2020

(54) APPARATUS AND METHOD FOR ADJUSTMENT OF TRANSMITTER POWER IN A SYSTEM

(71) Applicant: QUALCOMM Incorporated, San Diego, CA (US)

(72) Inventors: John Forrester, San Diego, CA (US); Paul A. Guckian, La Jolla, CA (US); Lin Lu, San Diego, CA (US); Reza Shahidi, San Diego, CA (US); Amit Mahajan, San Diego, CA (US); Walid M. Hamdy, San Diego, CA (US); Francis M. Ngai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/797,470

(22) Filed: Oct. 30, 2017

(65) Prior Publication Data

US 2018/0070320 A1 Mar. 8, 2018

Related U.S. Application Data

(62) Division of application No. 13/190,228, filed on Jul. 25, 2011, now abandoned.
(Continued)

(51) Int. Cl.
*H04B 1/04* (2006.01)
*H04W 52/30* (2009.01)
(Continued)

(52) U.S. Cl.
CPC ......... *H04W 52/30* (2013.01); *H04W 52/281* (2013.01); *H04W 52/226* (2013.01); *H04W 52/42* (2013.01)

(58) Field of Classification Search
CPC . H04W 52/226; H04W 52/281; H04W 52/30; H04W 52/42
See application file for complete search history.

(56) References Cited

U.S. PATENT DOCUMENTS 5,524,275 A 6/1996 Lindell
7,610,027 B2 10/2009 Alapuranen
(Continued)

FOREIGN PATENT DOCUMENTS

CN 1339881 A 3/2002
CN 1669186 A 9/2005
(Continued)

OTHER PUBLICATIONS

International Search Report and Written Opinion—PCT/US2011/045368, ISA/EPO—dated Oct. 24, 2011.

*Primary Examiner* — Xin Jia
(74) *Attorney, Agent, or Firm* — Patterson & Sheridan, L.L.P

(57) ABSTRACT

Certain aspects of the present disclosure propose methods for determining power level of one or more transmitters based on a power level of a primary transmitter when the transmitters are located in close proximity of each other. The power levels may be determined such that a combined power of all the transmitters is compliant with regulatory radio frequency (RF) safety requirements. For certain aspects, power level of the lower priority transmitters may be determined utilizing one or more look-up tables. For another aspect, power level of the lower priority transmitters may be calculated using an algorithm based on the power level of the priority transmitter. In aspects, the power level of lower priority transmitters and the time duration for which the transmitters are active may be selected dynami-
(Continued)

cally so that the time averaged power of the transmitters for a defined period of time falls below the RF exposure limit.

22 Claims, 10 Drawing Sheets

Related U.S. Application Data

(60) Provisional application No. 61/367,767, filed on Jul. 26, 2010, provisional application No. 61/448,110, filed on Mar. 1, 2011.

(51) Int. Cl.
*H04W 52/28* (2009.01)
*H04W 52/22* (2009.01)
*H04W 52/42* (2009.01)

(56) References Cited

U.S. PATENT DOCUMENTS

| | | | |
|---|---|---|---|
| 2003/0228875 A1* | 12/2003 | Alapuranen | H04W 52/225 455/522 |
| 2005/0239404 A1 | 10/2005 | Karabinis | |
| 2007/0111681 A1* | 5/2007 | Alberth, Jr. | H04B 1/3838 455/127.1 |
| 2007/0135154 A1* | 6/2007 | Gautier | H04B 1/3838 455/522 |
| 2009/0047998 A1 | 2/2009 | Alberth, Jr. | |
| 2009/0093219 A1 | 4/2009 | Katada et al. | |
| 2010/0130241 A1 | 5/2010 | Kitaji | |
| 2010/0291963 A1 | 11/2010 | Patel et al. | |
| 2012/0021707 A1 | 1/2012 | Forrester et al. | |

FOREIGN PATENT DOCUMENTS

| | | |
|---|---|---|
| CN | 101069365 A | 11/2007 |
| EP | 1605605 A2 | 12/2005 |
| EP | 1838040 A2 | 9/2007 |
| JP | 2005529561 A | 9/2005 |
| JP | 2012016017 A | 1/2012 |
| KR | 20050007563 A | 1/2005 |
| WO | WO-03105494 A2 | 12/2003 |
| WO | WO-2008069075 A1 | 6/2008 |

* cited by examiner

| Primary 850 MHz (dBm) | Secondary 700 MHz Power Reduction |
|---|---|
| P ≥ 22 | 6dB back off |
| 20 ≥ P < 22 | 4dB back off |
| 18 ≥ P < 20 | 2dB back off |
| P < 18 | 0dB back off |

FIG. 4A

| Primary 850 MHz (dBm) | 700 MHz Power Reduction | WLAN 2.4GHz Power Reduction |
|---|---|---|
| P ≥ 22 | 6dB back off | 3dB back off |
| 20 ≥ P < 22 | 4dB back off | 3dB back off |
| 18 ≥ P < 20 | 2dB back off | 0dB back off |
| P < 18 | 0dB back off | 0dB back off |

FIG. 4B

| Case | Note | Tx 1 MTPL (dBm) | Tx 1 Duty Cycle | Tx 1 SAR (mW/g) | Tx 2 MTPL (dBm) | Tx 2 Duty Cycle | Tx 2 SAR (mW/g) | Total SAR summation (mW/g) | FCC SAR Limit (mW/g 1gram volume) | Margin to SAR limit (dB) |
|---|---|---|---|---|---|---|---|---|---|---|
| 1 | Baseline SAR results | 24 | 100% | 1.20 | 24 | 100% | 1.20 | 2.40 | 1.60 | -1.761 |
| 2 | Reduce duty cycle TX2 | 24 | 100% | 1.20 | 24 | 25% | 0.30 | 1.50 | 1.60 | 0.280 |
| 3 | Reduce Power of TX 1 + Reduce duty cycle of TX2 | 21 | 100% | 0.60 | 24 | 75% | 0.90 | 1.50 | 1.60 | 0.276 |
| 4 | Tx 2 Reduced | 24 | 100% | 1.20 | 19.2 | 100% | 0.40 | 1.60 | 1.60 | 0.000 |
| 5 | Tx 1+2 Reduced the same | 22.2 | 100% | 0.80 | 22.2 | 100% | 0.80 | 1.60 | 1.60 | 0.000 |
| 6 | Tx 1+2 Reduced differently | 23 | 100% | 0.95 | 21.3 | 100% | 0.65 | 1.60 | 1.60 | 0.000 |

FIG. 9

APPARATUS AND METHOD FOR ADJUSTMENT OF TRANSMITTER POWER IN A SYSTEM

CLAIM OF PRIORITY UNDER 35 U.S.C. § 119

This application is a divisional of U.S. patent application Ser. No. 13/190,228, filed Jul. 25, 2011, which claims priority to U.S. Provisional Application No. 61/367,767, entitled, "Apparatus and Method for Adjustment of Transmitter Power of a Multi-Transmitter Communications Device," filed Jul. 26, 2010, and U.S. Provisional Application No. 61/448,110, entitled, "Apparatus and Method for Adjustment of Transmitter Power of a Multi-Transmitter Communications Device," filed Mar. 1, 2011, all of which are assigned to the assignee hereof and hereby expressly incorporated by reference herein.

TECHNICAL FIELD

Certain aspects of the present disclosure generally relate to transmission devices, and in particular, to methods and systems for devices comprising one or more transmitters.

BACKGROUND

Wireless communication systems are widely deployed to provide various types of communication such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and orthogonal frequency division multiplexing (OFDM) systems. As conditions in the channel vary, it may be necessary to activate certain resources and deactivate others. Similarly, the user may depend on several resources simultaneously. Some devices allow multiple transmitters to operate simultaneously to accomplish these various goals.

SUMMARY

Certain aspects of the present disclosure provide a method for wireless communications. The method generally includes identifying a power level for a first transmitter unit, selecting a power identifier for a second transmitter unit from one or more look-up tables based at least on the power level, wherein the first and the second transmitter units operate simultaneously using one or more transmit antennas, and adjusting transmit power of at least one of the first and the second transmitter units based on the power level and the power identifier, wherein the transmit power levels used by the first and the second transmitter units are less than or equal to an allowable power level which is determined to achieve a desired cumulative transmit power that can be referenced for compliance to an applicable radio frequency (RF) exposure limit.

Certain aspects of the present disclosure provide a method for wireless communications. The method generally includes identifying a first power level for a first transmitter unit, and dynamically selecting at least one of a second power level or an active time period for a second transmitter unit based on the first power level, wherein a total power used by the first and the second transmitter units is less than or equal to an allowable power level which is determined based on a radio frequency (RF) exposure limit, and the first and the second transmitter units operate near simultaneously using one or more transmit antennas.

Further, certain aspects of the present disclosure include methods of wireless communications is provided. The method includes (1) identifying a first power level for a first transmitter unit; and (2) dynamically selecting at least one of a second power level or an active time period for the first transmitter unit based on the first power level, wherein an average power used by the first transmitter unit for a period of time is less than or equal to an allowable power level which is determined based on at least one of a radio frequency (RF) exposure limit, a target margin to the RF exposure limit or a measured specific absorption limit (SAR) value for the first transmitter unit.

Certain aspects of the present disclosure provide an apparatus for wireless communications. The apparatus generally includes means for identifying a power level for a first transmitter unit, means for selecting a power identifier for a second transmitter unit from one or more look-up tables based at least on the power level, wherein the first and the second transmitter units operate near simultaneously using one or more transmit antennas, and means for adjusting transmit power levels of at least one of the first and the second transmitter units based on the power level and the power identifier, wherein the transmit power levels of the first and the second transmitter units are less than or equal to an allowable power level which is determined based on a radio frequency (RF) exposure limit.

Certain aspects of the present disclosure provide an apparatus for wireless communications. The apparatus generally includes means for identifying a first power level for a first transmitter unit, and means for dynamically selecting at least one of a second power level or an active time period for a second transmitter unit based on the first power level, wherein a total power used by the first and the second transmitter units is less than or equal to an allowable power level which is determined based on a radio frequency (RF) exposure limit, and the first and the second transmitter units operate near simultaneously using one or more transmit antennas.

Certain aspects of the present disclosure provide an apparatus for wireless communications. The apparatus generally includes means for identifying a first power level for a first transmitter unit, and means for dynamically selecting at least one of a second power level or an active time period for the first transmitter unit based on the first power level, wherein an average power used by the first transmitter unit for a period of time is less than or equal to an allowable power level which is determined based on at least one of a radio frequency (RF) exposure limit, a target margin to the RF exposure limit or a measured specific absorption limit (SAR) value for the first transmitter unit.

Certain aspects provide a computer-program product for wireless communications, comprising a computer-readable medium having instructions stored thereon, the instructions being executable by one or more processors. The instructions generally include instructions for identifying a power level for a first transmitter unit, instructions for selecting a power identifier for a second transmitter unit from one or more look-up tables based at least on the power level, wherein the first and the second transmitter units operate near simultaneously using one or more transmit antennas, and instructions for adjusting transmit power levels of at least one of the first and the second transmitter units based on the power level and the power identifier, wherein the transmit power levels of the first and the second transmitter units are less than or equal to an allowable power level which is determined based on a radio frequency (RF) exposure limit.

Certain aspects provide a computer-program product for wireless communications, comprising a computer-readable medium having instructions stored thereon, the instructions being executable by one or more processors. The instructions generally include instructions for identifying a first power level for a first transmitter unit, and instructions for dynamically selecting at least one of a second power level or an active time period for a second transmitter unit based on the first power level, wherein a total power used by the first and the second transmitter units is less than or equal to an allowable power level which is determined based on a radio frequency (RF) exposure limit, and the first and the second transmitter units operate near simultaneously using one or more transmit antennas.

Certain aspects provide a computer-program product for wireless communications, comprising a computer-readable medium having instructions stored thereon, the instructions being executable by one or more processors. The instructions generally include instructions for identifying a first power level for a first transmitter unit, and instructions for dynamically selecting at least one of a second power level or an active time period for the first transmitter unit based on the first power level, wherein an average power used by the first transmitter unit for a period of time is less than or equal to an allowable power level which is determined based on at least one of a radio frequency (RF) exposure limit, a target margin to the RF exposure limit or a measured specific absorption limit (SAR) value for the first transmitter unit.

Certain aspects of the present disclosure provide an apparatus for wireless communications. The apparatus generally includes at least one processor configured to identify a power level for a first transmitter unit, select a power identifier for a second transmitter unit from one or more look-up tables based at least on the power level, wherein the first and the second transmitter units operate near simultaneously using one or more transmit antennas, and adjust transmit power levels of at least one of the first and the second transmitter units based on the power level and the power identifier, wherein the transmit power levels of the first and the second transmitter units are less than or equal to an allowable power level which is determined based on a radio frequency (RF) exposure limit, and a memory coupled to the at least one processor.

Certain aspects of the present disclosure provide an apparatus for wireless communications. The apparatus generally includes at least one processor configured to identify a first power level for a first transmitter unit, and dynamically select at least one of a second power level or an active time period for a second transmitter unit based on the first power level, wherein a total power used by the first and the second transmitter units is less than or equal to an allowable power level which is determined based on a radio frequency (RF) exposure limit, and the first and the second transmitter units operate near simultaneously using one or more transmit antennas, and a memory coupled to the at least one processor.

Certain aspects of the present disclosure provide an apparatus for wireless communications. The apparatus generally includes at least one processor configured to identify a first power level for a first transmitter unit, and dynamically select at least one of a second power level or an active time period for the first transmitter unit based on the first power level, wherein an average power used by the first transmitter unit for a period of time is less than or equal to an allowable power level which is determined based on at least one of a radio frequency (RF) exposure limit, a target margin to the RF exposure limit or a measured specific absorption limit (SAR) value for the first transmitter unit, and a memory coupled to the at least one processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 4A and 4B illustrate aspects of a power lookup table for a two-transmitter and a three-transmitter device, respectively, in accordance with certain aspects of the present disclosure.

FIG. 9 illustrates an example compliance with specific absorption rate (SAR) for a device with two transmitters, in accordance with certain aspects of the present disclosure.

DETAILED DESCRIPTION

Wireless communication devices (e.g., mobile cell phones, personal data assistants, laptops and the like) are generally subject to regulatory radio frequency (RF) safety requirements. These systems must operate within specific guidelines before they can enter the market. For example, devices operating near the human body are evaluated to determine the Specific Absorption Rate (SAR) their electromagnetic waves produce. SAR is the time-rate of electromagnetic energy absorption per unit of mass in a lossy media, and may be expressed as follows:

$$SAR(r) = \frac{\sigma(r)}{\rho(r)} |E(r)|^2_{rms} \qquad \text{Eqn (1)}$$

where E(r) is the exogenous electric field at point r, rms stands for root mean square, while σ(r) and ρ(r) are the corresponding equivalent electrical conductivity and mass density, respectively. Generally, SAR testing evaluates the amount of energy absorbed into the body from a device with a single or multiple transmitters. Under an alternate requirement, devices operating at distances beyond 20 centimeters may be evaluated through a maximum permissible exposure (MPE) calculation or measurement.

Compliance with the SAR requirement may be a challenge for devices, for example, that allow multiple transmitters to transmit simultaneously or are operated close to or inside the human body. Specially, for configurations where the simultaneous transmitters share a common antenna as well as in configurations where the transmitters have co-located antennas (e.g., separate, independent antennas in close proximity to one another). As used herein, the term "co-located" generally means "in close proximity to," and applies to antennas or transmitters within the same device enclosure or separate devices that are in close proximity to each other. This may be true for handheld devices such as mobile phones subject to SAR testing, but may also be a concern for high-power transmitters, such as a wireless wide area network (WWAN) base station, co-located with other transmitters at an antenna site.

To certify a device, the device must comply with RF exposure requirements, for example, even while all the transmitters transmit simultaneously and operate at their maximum allowable transmitter power. A system and method are provided so that the maximum transmit power for one or more transmitters are established to achieve compliance with the regulatory limit in a simultaneous transmitter configuration.

Figure 1:
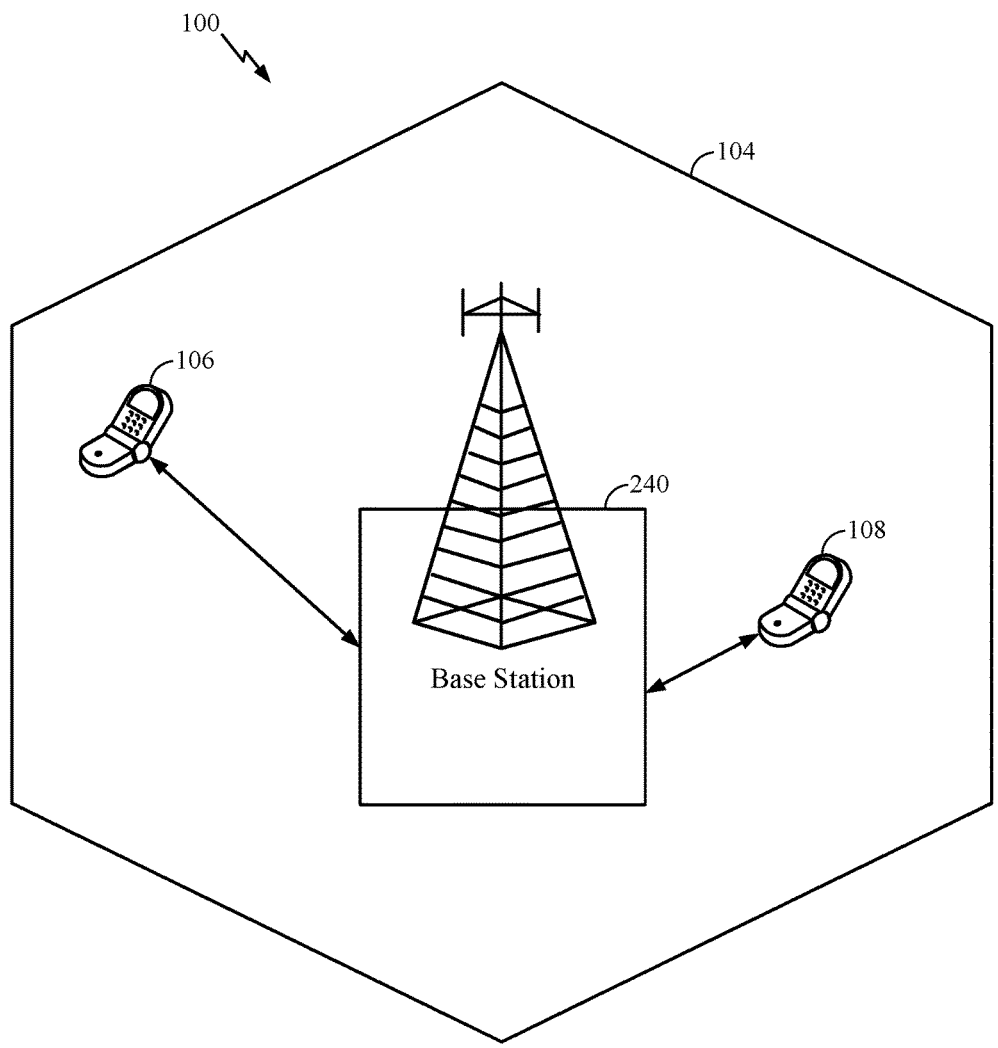
FIG. 1 illustrates an exemplary wireless communication network.

FIG. 1 illustrates an exemplary wireless communication network 100. The wireless communication network 100 comprises a base station 240, a cell 104, user equipment 106 (such as a wireless communication device or mobile device), and a wireless device 108. The wireless communication network 100 is configured to support communication between a number of users. Although the wireless communication network 100 is illustrated as containing only one cell 104, the wireless communication network may comprise any number of cells. Communication coverage in cell 104 may be provided by the base station 240. The base station 240 may interact with a plurality of wireless communication devices, for example, wireless communication devices 106 and 108.

Each of the wireless communication devices may communicate with base station 240 on a forward link (FL) and/or a reverse link (RL) at a given moment. A FL is a communication link from a base station to a wireless communication device. A RL is a communication link from a wireless communication device to a base station. The base station 240 may be interconnected to base stations in other cells (not shown in this figure), for example, by appropriate wired or wireless interfaces. Accordingly, the base station 240 may communicate with wireless communication devices in other cells (not shown in this figure).

With continuing reference to FIG. 1, the cell 104 may cover only a few blocks within a neighborhood or several square miles in a rural environment. Each cell may be further divided into one or more sectors (not shown in this figure). By including additional cells, the wireless communication network 100 may provide service over a large geographic region, as is well known in the art.

A wireless communication device (e.g., 106) may be a device (e.g., a mobile phone, router, personal computer, server, etc.) used by a user to send and receive voice or data over a communications network. A wireless communication device may be referred to as an access terminal (AT), a user equipment (UE), a mobile station (MS), or a terminal device. As shown, wireless communication devices 106 and 108 may comprise mobile phones. However, the wireless communication devices may comprise any suitable communication device.

It may be desirable for a wireless device (e.g., 106) to transmit information to and receive information from another wireless device, such as the wireless device 108 or a wireless device in another cell (not shown in this figure). The wireless device 106 may accomplish this by first communicating with the base station 240 via a wireless link. For example, the wireless device 106 may generate and transmit a message to the base station 240. The base station 240 may then generate and transmit a message to another wireless device, such as the wireless device 108.

Figure 2:
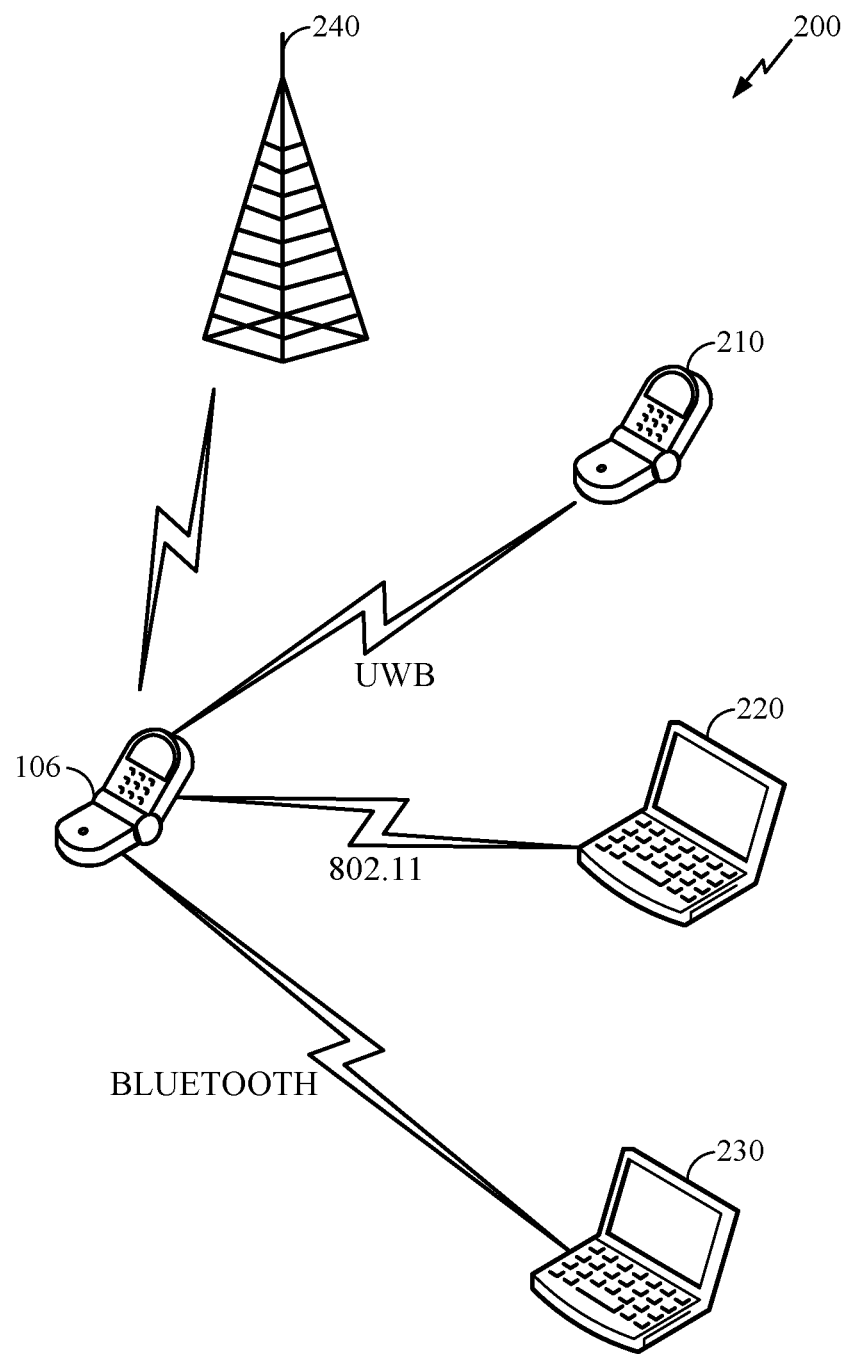
FIG. 2 is a block diagram illustrating a mobile device in a wireless communication network.

The wireless device 106 may perform a plurality of tasks across various communication systems within the communication network, using a plurality of co-located transmitters. FIG. 2 is a block diagram illustrating a mobile device in a wireless communication network 200. The wireless communication network 200 comprises four wireless devices (e.g., 106, 210, 220, and 230), and a base station 240. The wireless communication network 200 may be configured to support communication between a multitude of devices, such as the wireless communications devices 106, 210, 220, 230 and base station 240. The wireless devices (e.g., 106, 210, 220 and 230) may comprise, for example, personal computers, PDAs, music players, video players, multimedia players, televisions, electronic game systems, digital cameras, video camcorders, watches, remote controls, headsets, and the like. Wireless device 106 may be simultaneously in communication with each of devices 210, 220, 230, and 240 via one or more transmitters co-located on the device 106.

With continuing reference to FIG. 2, the wireless device 106 may communicate with other wireless devices (e.g., 210, 220) over a variety of communication channels. The communication channels may comprise Ultra-Wide Band (UWB) channels, Bluetooth channels, Institute of Electrical and Electronic Engineers (IEEE) 802.11 channels (e.g., IEEE 802.11a, IEEE 802.11b, IEEE 802.11g, and IEEE 802.11n), infrared (IR) channels, ZigBee (IEEE 802.15) channels, or a variety of other channels, as is well known in the art. In one aspect, the channel may be a UWB channel conforming to the European Computer Manufacturers Association (ECMA)-368 standard. Other channels would be readily recognized as possible as well.

The wireless communications network 200 may comprise a wireless local area network (WLAN) covering a physical area, such as a home, an office, or a group of buildings. A WLAN may use standards such as, the IEEE 802.11 standard (e.g., IEEE 802.11g), and/or other standards for wireless communications. A WLAN may use peer-to-peer communication in which the wireless communication devices directly communicate with each other. The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), and ZigBee standards, and/or other standards for wireless communications. A WPAN may use peer-to-peer communication in which the wireless communication devices directly communicate with each other. The mobile device 106 may connect to another network, such as a wireless communications network or the Internet, through network 200. The messages sent across the wireless communications network 200 may comprise information related to various types of communication (e.g., voice, data, multimedia services, and the like) and may be of varied degrees of importance to the user of mobile device 106, as described in greater detail below.

Although the following aspects may refer to FIG. 1, one will recognize that they are readily applicable to other communication standards. For example, certain aspects may be applicable in a UMTS communication system. Some aspects may be applicable in an orthogonal frequency division multiple access (OFDMA) communication system. The communication system 200 may further comprise any type of communication system including, but not limited to, a code division multiple access (CDMA) system, a global system for mobile communication system (GSM), a wideband code division multiple access (WCDMA), and an OFDM system.

Certain aspects of the present disclosure propose methods for determining power level of one or more transmitters based on a power level of a primary transmitter when the transmitters are "co-located" meaning they are in close proximity of each other (e.g., on a single device or multiple neighboring devices).

The power levels may be determined such that a combined power, for example, of all the transmitters is compliant with regulatory radio frequency (RF) safety requirements. For certain aspects, power level of the lower priority transmitters may be determined based on the power level of the priority transmitter utilizing one or more look-up tables. The look-up tables may include a plurality of predetermined power values or a plurality of predetermined power adjustment values. For example, the predetermined power adjustment values may correspond to a lower priority transmitter. In addition, one or more look-up tables may correspond to one or more transmission frequencies. For another aspect, power level of the lower priority transmitters may be calculated using an algorithm based on the power level of the priority transmitter.

For certain aspects, the power level of lower priority transmitters and the time duration for which the transmitters are active may be selected dynamically so that the time averaged power of the transmitters for a defined period of time falls below the RF exposure limit. For certain aspects, priority of transmitters may be determined first and power level of the lower priority transmitter may be determined based on the power level of the higher priority transmitter.

Figure 3:
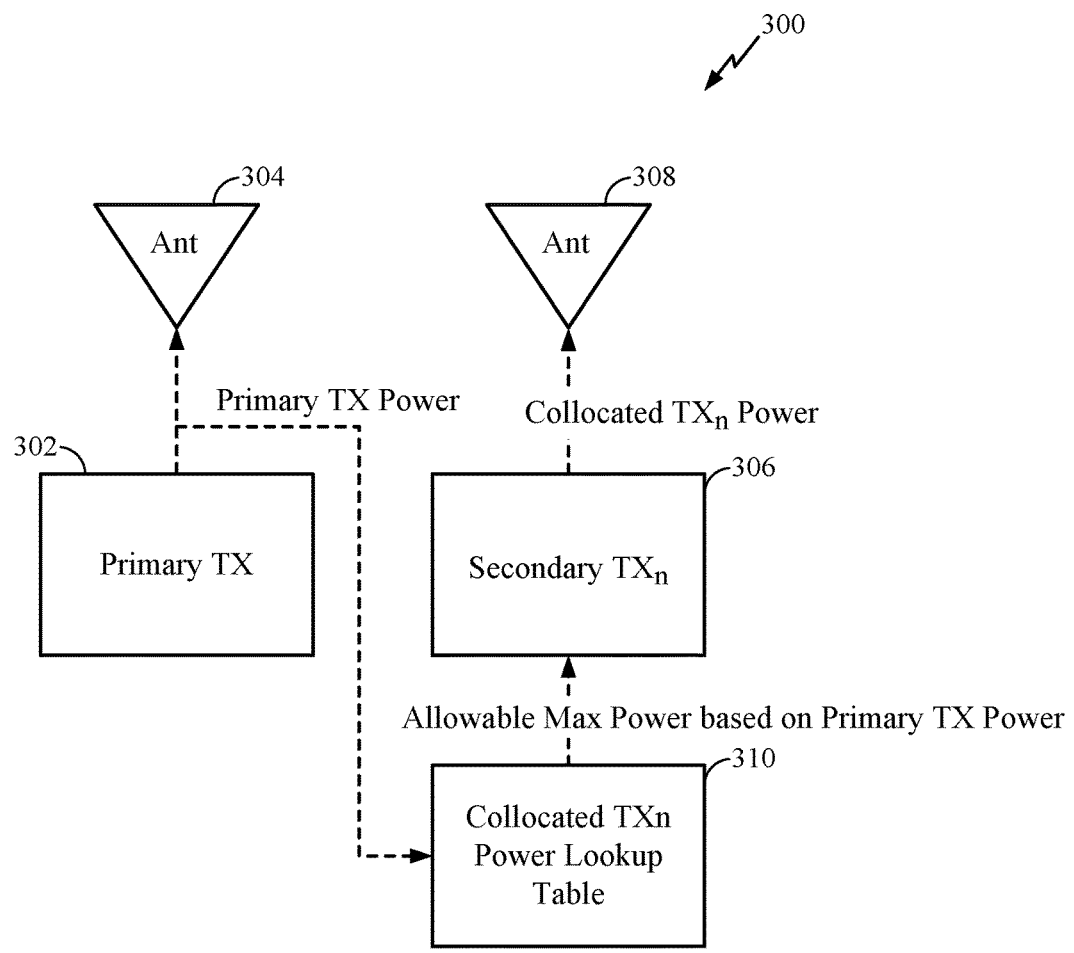
FIG. 3 illustrates a block diagram of a transmission system comprising two transmitters, in accordance with certain aspects of the present disclosure.

FIG. 3 illustrates a block diagram of a transmission system in a mobile device 106 comprising two transmitters. In this aspect, the mobile device 106 comprises two antennas 304 and 308 that are co-located on the mobile device 106. Antenna 304 is associated with a primary transmission module 302. Antenna 308 is associated with a secondary transmission module 306. These transmission modules transmit communication signals through the respective antennas. For example, transmission module 302 may comprise software and/or hardware (e.g., a transmitter circuit) responsible for voice communications, for which antenna 304 may be utilized. Transmission module 306, in contrast, may comprise software and/or hardware which transfer data using antenna 308. Although only two transmitters are shown here, one skilled in the art would readily recognize that any number of transmitters may be used. In addition, the transmitters may be located on a single device or multiple devices (not shown) who are in close proximity of each other, such as a base station, co-located with other transmitters at an antenna site.

For certain aspects transmission power levels may be adjusted for each of the antennas 304 and 308 to be in agreement with regulatory requirements using a "Power Lookup Table" 310. The power lookup table may be embodied in a storage module such as a memory device, as will be described in greater detail in FIGS. 4A and 4B.

The power levels of both the primary and lower priority transmitters must be such that their cumulative SAR remains within the regulatory requirements. Accordingly, in certain aspects, the power is first set for the primary transmitter, and then the corresponding power level is set for the remaining transmitters based on the power level of the primary transmitter, so that their combined SAR effect is within regulatory limits. In these aspects, the relationship between power level of the primary transmitter and the power levels for the other transmitters may be stored in the power look-up table, as illustrated in FIG. 4A.

The transmission modules 302 and 306 may monitor the transmit power of their respective transmitters. The transmission module 306 may reduce maximum transmission power of antenna 308 by a fixed value based on the transmit power of the primary module using the lookup table 310. For certain aspects, the mobile device may comprise multiple lookup tables to address different transmitter-frequency combinations.

FIGS. 4A and 4B provide example aspects of a power lookup table 310, in accordance with certain aspects of the present disclosure. The look-up table in FIG. 4A comprises two columns and four rows.

As depicted in the headers of the table, the table of FIG. 4A depicts the maximum power reduction imposed on a second transmitter (e.g., 700 MHz) based on the values of a Primary transmitter (e.g., 850 MHz), when the transmitters are co-located on the same device (e.g., mobile or fixed), or when they are placed in close proximity of each other on separate neighboring devices.

For certain aspects, several threshold values may be defined for power of the primary transmitter, based on which transmission power of other transmitters may be adjusted. For example, as shown in the table, when greater than or equal to 22 decibel milliwatts (dBm) are generated by the primary transmitter 302, a 6 dB back-off may be imposed on the second transmitter. If transmission power of the primary transmitter is greater than or equal to 20 and less than 22 dBm, a 4 dB back off may be imposed on the second transmitter. If transmission power of the primary transmitter is greater than or equal to 18 and less than 20 dB, a 2 dB back off may be imposed on the secondary transmitter. Similarly, if transmission power of the primary transmitter is below 18 dBm, back off may not be necessary for the secondary transmitter. In this example, the combined effects of the primary and secondary transmitter may not exceed the regulatory threshold.

The table of FIG. 4B illustrates an example power relationships between a highest priority transmitter (e.g., 850 MHz) co-located with a 700 MHz transmitter and a 2.4 GHz WLAN transmitter. Similar to the FIG. 4A, for certain aspects, transmission power values for the highest priority transmitter may dictate the back offs imposed for each of the second and third transmitters. Also as in FIG. 4A, the back offs imposed on the second and third transmitters may become further diminished with decreased values for the primary transmitter.

Particularly, the table 4B shows that when the primary transmitter uses a power greater than or equal to 22 dBm, a 6 dB back off may be imposed on the secondary transmitter, and a 3 dB back off on the third transmitter. If transmission power of the primary transmitter is greater than or equal to 20 and less than 22 dB, a 4 dB back off may be imposed on the secondary transmitter, and a 3 dB back off on the third transmitter. If transmission power of the primary transmitter is greater than or equal to 18 and less than 20 dB, a 2 dB back off may be imposed on the secondary transmitter, and the third transmitter may remain unchanged. Finally, if the primary transmitter drops below 18 dB, the second and third transmitters may remain unchanged.

It should be noted that the values presented in FIGS. 4A and 4B are mere examples and they may have any fixed or variable values. In addition, any number of transmitters (e.g., two or more) that are working under different frequencies may be located on a single or multiple neighboring devices, all of which fall within the scope of the present disclosure.

For certain aspects, the values in tables 4A and 4B may be generated by a two-step process. In the first step, a "scaling factor" for each transmitter power level may be determined, where the transmitters are ordered in levels of descending relative priority. In the second step, these "scaling factors" may be used to determine the back-off magnitude entries of lower priority transmitters based on power value of the highest priority transmitter.

Particularly, for each possible range of the highest priority transmitter (column 1 in FIGS. 4A and 4B), the entries for each lower priority transmitter may be determined (e.g., the respective rows of FIGS. 4A and 4B) based on the scaling factors and possible power range of the highest priority transmitter.

The cumulative absorption rate effect $(SAR(r)_{Total})$ of an N transmitters at a given point r may be written as follows:

$$SAR(r)_{Total} = \sum_{t=1}^{N} \alpha_t SAR_t(r) \quad \text{Eqn (2)}$$

Measured SAR for transmitter t in a given frequency band at maximum transmit power may be depicted by $SAR_t(r)$. The scaling factor $\alpha_t$ may represent the maximum transmit power scaling factor for transmitter t which may be a number between zero and one. Equation (2) shows how each transmitter may be scaled to achieve a target SAR value for a given transmitter combination. The target SAR Value $SAR(r)_{Total}$ may be equal to the SAR limit minus a desired margin.

Figure 5:
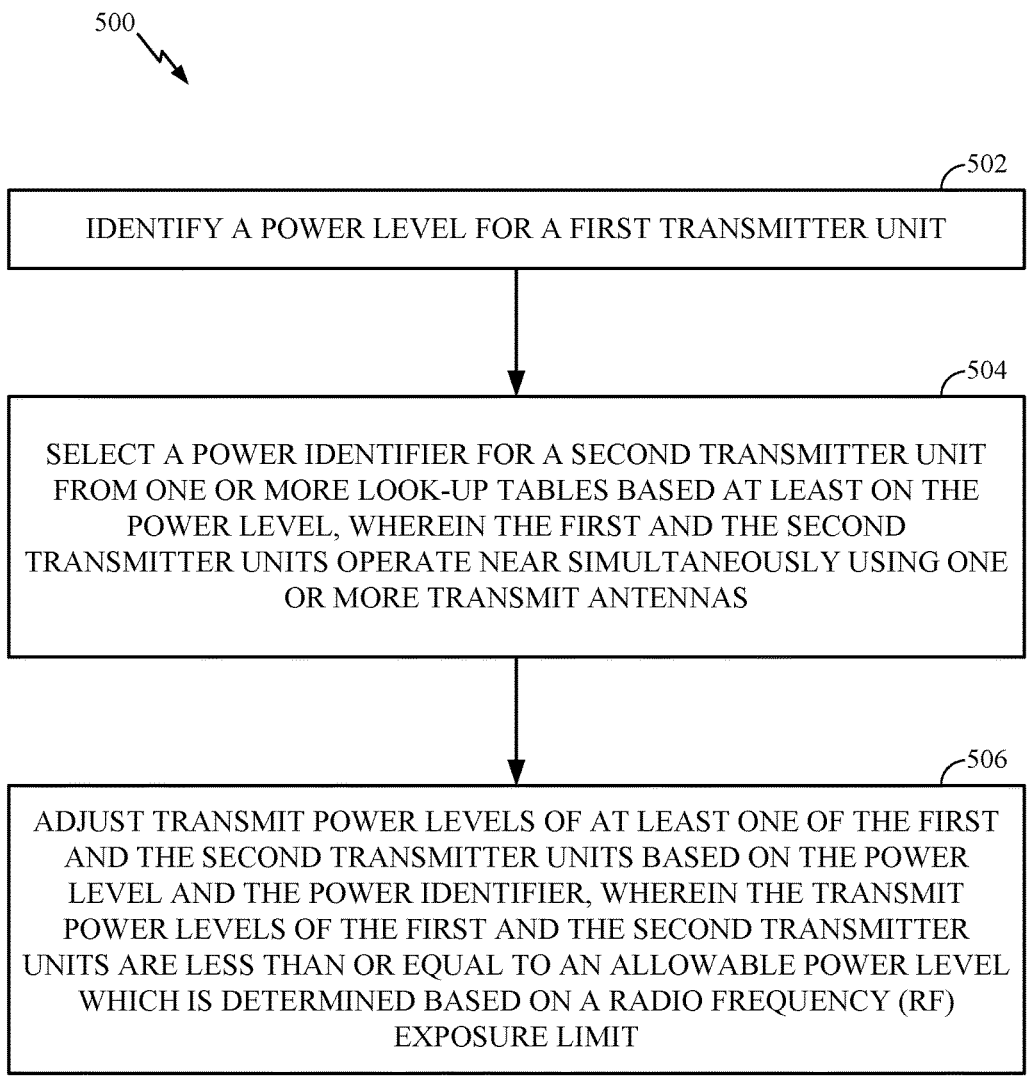
FIG. 5 illustrates example operations for adjusting transmission power of a transmitter unit in a multi-transmitter wireless device, in accordance with certain aspects of the present disclosure.

FIG. 5 illustrates example operations 500 for adjusting transmission power of a transmitter unit in a multi-transmitter wireless device, in accordance with certain aspects of the present disclosure.

At 502, the device identifies a power level for a first transmitter unit. At 504, the device selects a power identifier for a second transmitter unit from one or more look-up tables based at least on the power level, wherein the first and the second transmitter units operate near simultaneously using one or more transmit antennas. For some aspects, the distance between the transmit antennas may be less than or equal to a threshold (e.g., 20 centimeters).

At 506, the device adjusts transmit power levels of at least one of the first and the second transmitter units based on the power level and the power identifier, wherein the transmit power levels of the first and the second transmitter units are less than or equal to an allowable power level which is determined based on a radio frequency (RF) exposure limit. The device may continue adjusting transmit power of the remaining transmitters by repeating the above operations.

For certain aspects, the transmit system may monitor the transmit power of a primary transmitter and may reduce co-located simultaneous or near-simultaneous transmitters by a value that may be calculated utilizing a power adjustment algorithm (e.g., instead of using a look-up table). The power adjustment algorithm may take into account transmit power of the primary transmitter, the regulatory RF exposure limit, a target margin to the RF exposure limit, and/or measured SAR values for each transmitter.

Since SAR requirements may scale linearly with average transmit power, the algorithm may adjust transmit power for one or more transmitters based on the transmit power of the primary transmitters to reduce the SAR contribution from all the transmitters (e.g., N). One or more scaling factors (e.g., one for each transmitter unit) may be calculated such that the combined SAR equals a target value associated with the regulatory limit. The process of calculating the transmit power of each of the transmitters based on the transmit power of a primary transmitter may be repeated for each frequency combination of the transmitters.

Figure 6:
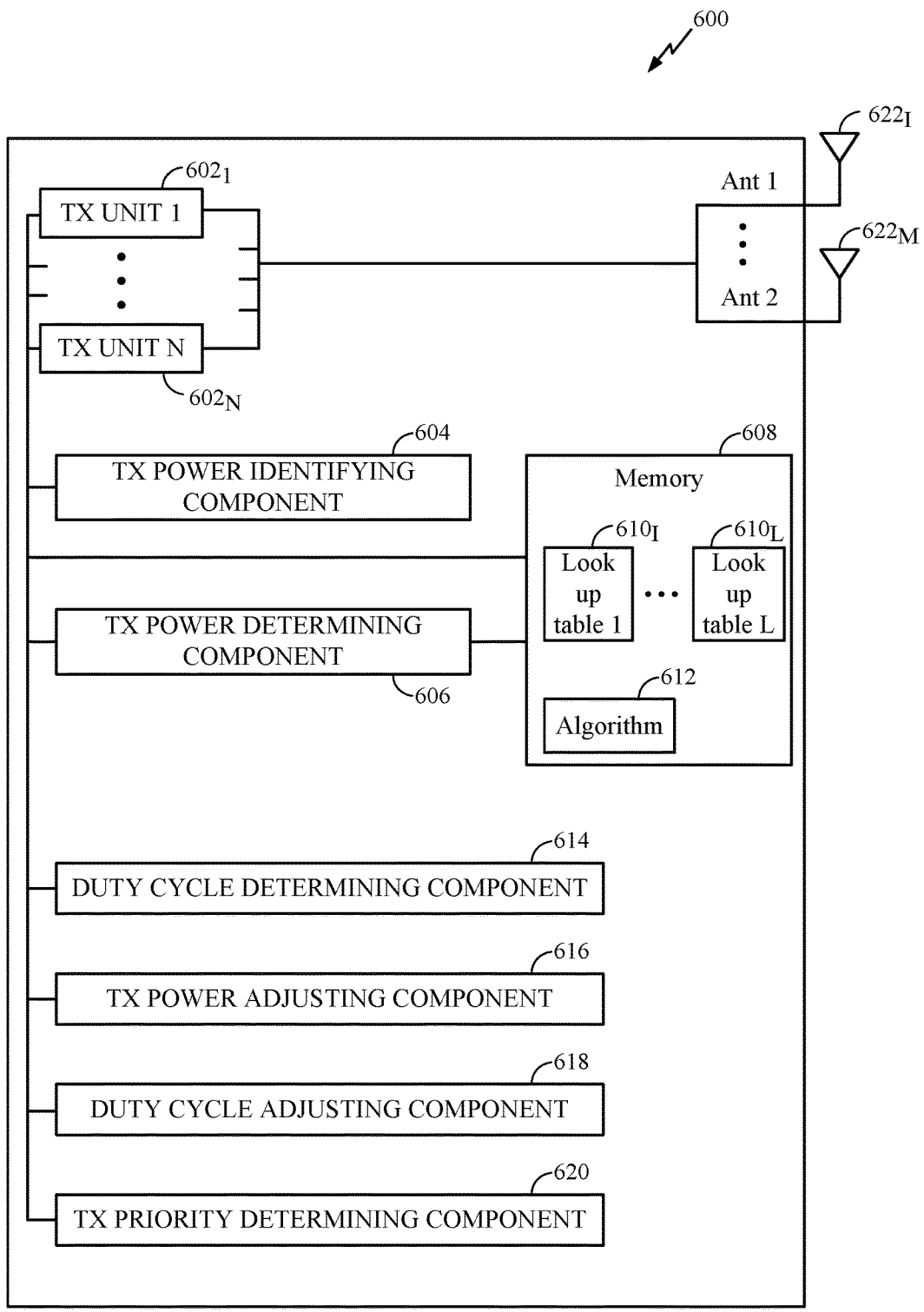
FIG. 6 illustrates a functional block diagram of a wireless device, in accordance with certain aspects of the present disclosure.

FIG. 6 illustrates a functional block diagram 600 of a wireless device in accordance with certain aspects of the present disclosure. The wireless device may include a plurality of transmitter units (e.g., TX unit1 $602_1$, . . . , TX unit N $602_N$) that may be connected to a plurality of transmit antennas antenna1 $622_1$, . . . , antennaM $622_M$. In general, one or more transmitter units may be connected to each transmit antenna.

The wireless device may include a TX power identifying component 604 that identifies transmit power of a primary transmitter (e.g., with highest priority). The wireless device may include a TX power determining component 606 that may either select a transmit power for a lower priority transmitter from a look up table based on the transmit power of the primary transmitter or calculate the transmit power utilizing an algorithm such that combination of transmit powers of all the TX units is less than regulatory limits. A memory 608 may store one or more look-up tables (e.g., $610_1$, . . . , $610_L$). The look-up tables may store the relationship between the transmit power of the primary transmitters and the lower priority transmitters.

The memory may also store code or software for a TX power determining algorithm 612 that determines the transmit powers of lower priority transmitters based on the transmit power of the highest priority transmitter. The wireless device may also include a duty cycle determining component 614 for determining duty cycle for the transmission of the lower priority transmitter units (as discussed in further detail below).

A TX power adjusting component 616 may be utilized to adjust the transmission power used by each of the transmission units. A duty cycle adjusting component 618 may also be used to adjust the duty cycle of the transmissions by each of the TX units (e.g., $602_2$). A TX unit priority determining component 620 may determine priority of the transmissions by each of the TX units. A controller 624 may control flow of the signals in the wireless device.

Figure 7:
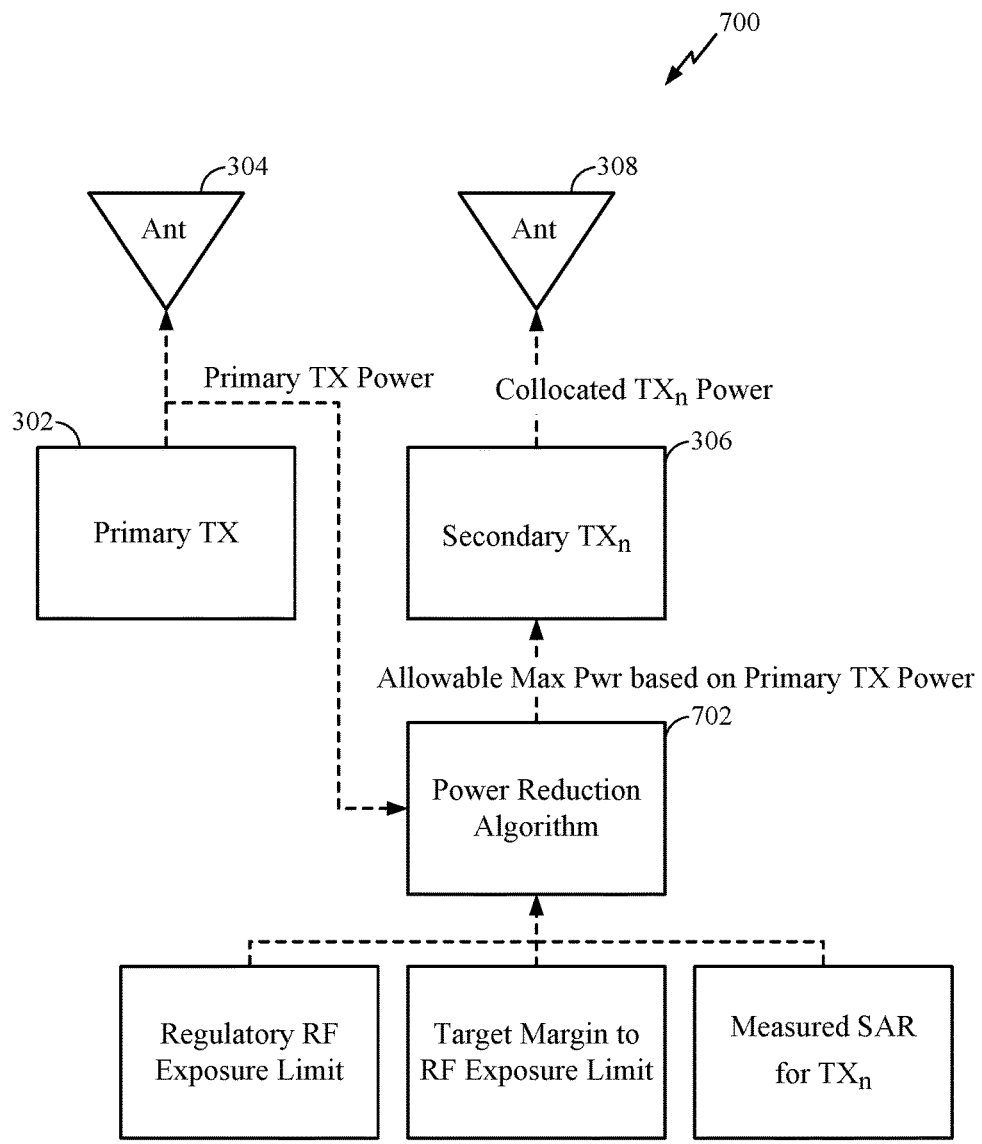
FIG. 7 illustrates a block diagram of a transmission system in a mobile device 106 comprising two transmitters, in accordance with certain aspects of the present disclosure.

FIG. 7 illustrates a block diagram of a transmission system in a mobile device 106 comprising two transmitters. As illustrated, the transmission system is similar to the one illustrated in FIG. 3, with a difference that power adjustment may be performed using a power reduction algorithm 702.

The power reduction algorithm may determine the power reduction value for each lower priority transmitter based on the power of a priority transmitter utilizing one or more of the following parameters: the regulatory RF exposure limit, target margin to the RF exposure limit, and measured SAR for each of the transmitters.

A critical parameter for RF exposure evaluation may be the average power, since there is a direct relationship between average power and resulting RF exposure value for a transmitter. For certain aspects, transmit power and duty cycle (e.g., the time duration that each transmitter is active or is turned off) of co-located transmitters on a device may be adjusted dynamically to achieve compliance with a regulatory RF exposure limit. Maximum transmitter power and duty cycle of each of the transmitters may be adjusted to modify the effective average power of each individual transmitter and adjust the total RF exposure level of the device.

Generally, when a device is designed, performance of the device with respect to RF safety compliance is profiled to establish baseline RF exposure results. For certain aspects, using the baseline RF exposure of the device, maximum transmit power and/or duty cycle of the transmitter may be adjusted to reduce the overall RF exposure performance of the device. The maximum transmit power can be adjusted to reduce the SAR contribution from the respective transmitter and/or the duty cycle of a transmitter may be reduced to lower the contribution from the respective transmitter.

RF exposure may typically be reported as a peak value. For certain aspects, the transmitter parameters may be adjusted dynamically during transmission (if allowed by the respective regulator), so that the time averaged SAR for a defined period of time is less than the SAR limit. Therefore, a transmitter may transmit with a power that is higher than the SAR limit for a short period of time, but transmits with lower power values (or is off) the rest of the time so that the average power of the transmitter is lower than the SAR limit during the defined time period. It should be noted that either the primary transmitter or one or more other lower priority transmitters may utilize the time-averaging concept to adjust their transmit power values over the defined time period.

With live knowledge of the transmitted power of each transmitter during a connection, a device can analyze the transmission parameters for all transmitters and adjust the respective duty cycle and/or maximum transmit power may thus be dynamically adjusted to provide the optimum connection performance while maintaining compliance with the required RF exposure limit.

The decision process as to how to modify the transmitter performance may be dependent on device design, the requirements for the wireless connections, and the applicability of the time limit for SAR. It should also be noted that technologies such as CDMA2000 and UMTS inherently have a time duplex feature. Therefore, changing the duty cycle may require either a standard change or device specific implementation that controls how long the transmitter is active.

The proposed technique can be used to address compliance for both MPE and SAR. An example implementation where the maximum transmit power and transmitter duty cycles are adjusted to achieve SAR compliance is followed. The relationship between average SAR over a period of time "T" may be written as follows:

$$\text{Time Averaged } SAR = \frac{1}{T}\int_0^T \sum_{n=1}^N \alpha_n(t)\beta_n(t)SAR_n dt = SAR_{Target}$$

in which $\alpha_n$ may represent transmit power scaling factor for transmitter n at maximum transmitter power vs. time, $\beta_n$ represents transmit power duty cycle scaling factor for transmitter n versus time, and $SAR_{Target}$ represents desired SAR based on regulatory exposure limit and margin.

Figure 8:
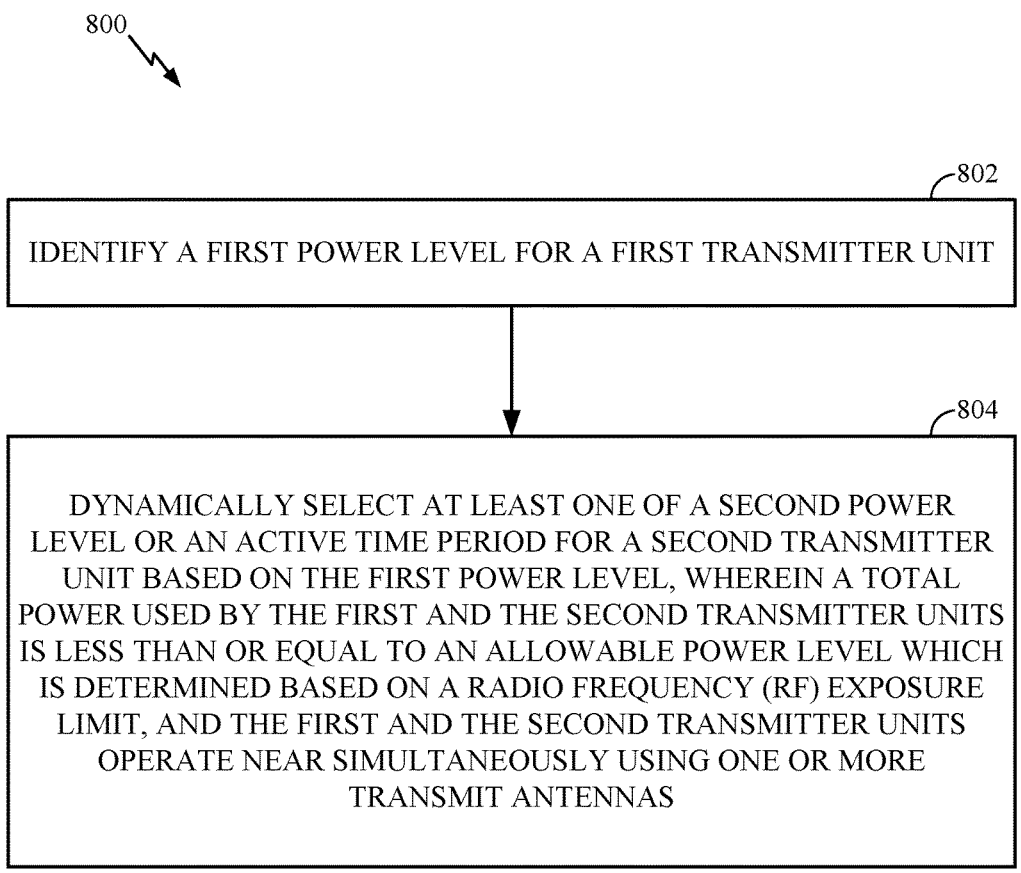
FIG. 8 illustrates example operations for adjusting transmit power of a transmitter unit in a multi-transmitter wireless device, in accordance with certain aspects of the present disclosure.

FIG. 8 illustrates example operations 800 for adjusting transmit power of a transmitter unit in a multi-transmitter wireless device, in accordance with certain aspects of the present disclosure.

At 802, the wireless device may identify a first power level for a first transmitter unit. At 804, the wireless device may dynamically select at least one of a second power level or an active time period (e.g., duty cycle) for a second transmitter unit based on the first power level, wherein a total power used by the first and the second transmitter units is less than or equal to an allowable power level which is determined based on an RF exposure limit. The first and the second transmitter units operate virtually simultaneously using one or more transmit antennas. In addition, a distance between the transmit antennas is less than or equal to a threshold.

FIG. 9 illustrates an example SAR compliance for a device with two transmitters. As illustrated in the table, the individual SARs are compliant with the Federal Communications Commission (FCC) limit of 1.6 mW/g but the combined SAR value (e.g., total SAR summation 902) exceeds the SAR limit. The table shows how SAR compliance can be achieved by reducing the duty cycle of one transmitter by a factor of 25%, reducing one of the transmitters by 4.8 dBm, or by a combination of reducing transmit power and duty cycles for both transmitters.

For certain aspects, the transmitters on a device may be prioritized before determining maximum transmit power or time domain duty cycle of the transmitters in the device. By setting the priorities, certain transmitters may be given more flexibility in their power demands than other transmitters in the device. For example, priority transmitters may receive the highest power compared to the other transmitters in the device, and the power level of the priority transmitter may be used when determining the power level for lower priority transmitters.

Additional decision making may be necessary to determine how the transmitter output power or duty cycle should be modified to achieve regulatory compliance while still maintaining an adequate end user experience and proper operational behavior.

For example, in the table described in FIG. 4B, it was determined that the primary 850 MHz transmitter had higher priority than the 700 Mhz transmitter, which in turn was given higher priority than the 2.4 GHz WLAN transmitter. This determination may affect the relationship between the power level restrictions in the lookup table. In some aspects, the relative priority of transmitters may be hardcoded in the system, whereas in other aspects, the priority may be dynamically adjusted during use.

For certain aspects, a UE with co-located simultaneous transmitters may determine priority of its transmitters based on a plurality of parameters such as the previously determined relative priority of one or more other transmitters, available antennas, MIMO, frequency bands, transmitters, data priorities, load of the network, RF conditions (e.g., receive quality, frequency band, and the like), available technologies, cost of data connection (e.g., WWAN vs. free WLAN or WPAN, USB connection), and the like.

Based on the priorities, the device may limit performance of some transmitters while assigning maximum possible power to the highest priority transmitters. The device may consider the type of service for which the transmitter is presently employed.

For example, where mobile device 106 is a cellular phone, voice communication services may generally be given higher priority than internet access, or a text messaging service. Different voice services may additionally be prioritized differently—for example, when the user roams outside their "home" network, into that of another service provider, the transmitter may be given lower priority to minimize excess fees. Furthermore a service being used for an emergency communication may be given a higher priority than any other service regardless of their previous relationship.

Figure 10:
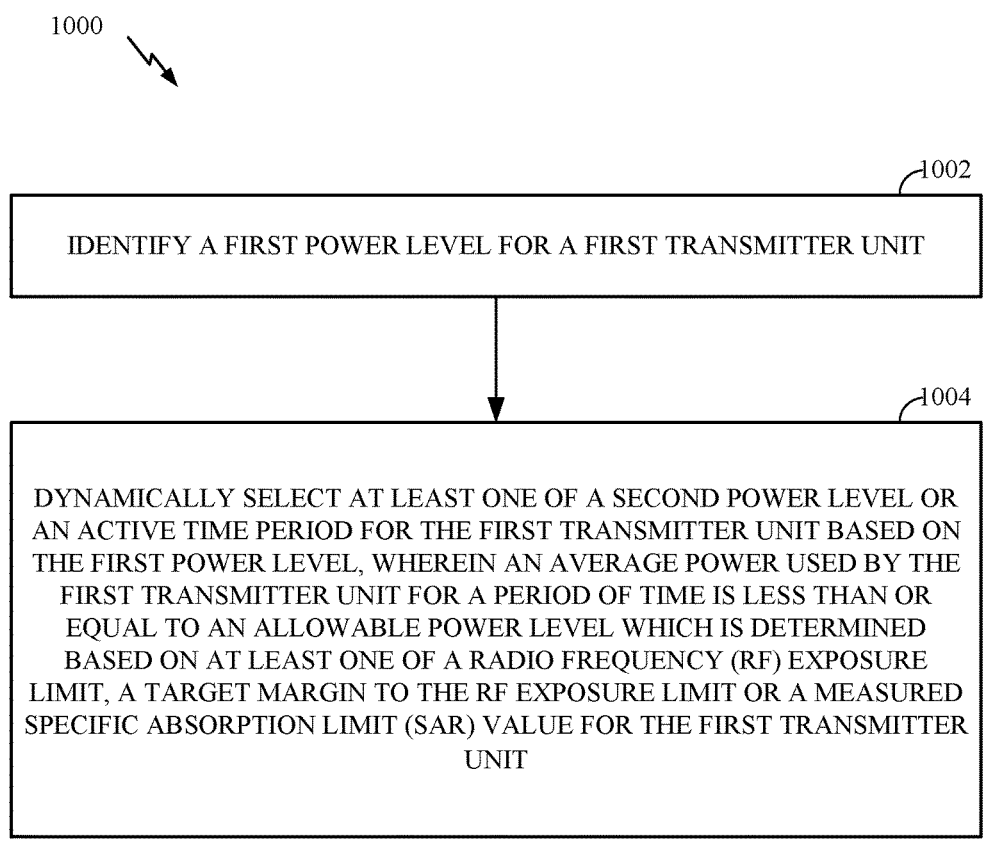
FIG. 10 illustrates example operations for adjusting transmit power of a transmitter unit in a wireless device, in accordance with certain aspects of the present disclosure.

FIG. 10 illustrates example operations 1000 for adjusting transmit power of a transmitter unit in a wireless device, in accordance with certain aspects of the present disclosure. At 1002, the wireless device may identify a first power level for a first transmitter unit. At 1004, the wireless device may dynamically select at least one of a second power level or an active time period for the first transmitter unit based on the first power level, wherein an average power used by the first transmitter unit for a period of time is less than or equal to an allowable power level which is determined based on at least one of a radio frequency (RF) exposure limit, a target margin to the RF exposure limit or a measured specific absorption limit (SAR) value for the first transmitter unit.

It should be noted that although most of the above disclosure assumes transmitter units are located on a single device for ease of explanation, the transmit units may also be located on separate devices that are in close proximity of each other. In addition, the transmitter units may operate simultaneously or near simultaneously (e.g., start or finish operating with a small delay). In addition, utilizing the proposed methods, power level of one or more transmitter units may be determined based on the power level of the primary transmitter unit.

The various operations of methods described above may be performed by various hardware and/or software component(s) and/or module(s) corresponding to means-plus-function blocks illustrated in the Figures. For example, means for identifying a power level may be a circuit or device capable of identifying the power level, such as the TX power identifying component 604. Means for selecting a power identifier may be a circuit or device capable of selecting the power level, such as the TX power determining component 606. Means for adjusting transmit power may be a circuit or device capable of adjusting the power level, such as the TX power adjusting component 616. Means for selecting duty cycle may be a circuit or device capable of selecting duty cycle, such as the duty cycle determining component 614.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims. For example, according to an aspect methods of wireless communications is provided. The method includes (1) identifying a first power level for a first transmitter unit; and (2) dynamically selecting at least one of a second power level or an active time period for the first transmitter unit based on the first power level, wherein an average power used by the first transmitter unit for a period of time is less than or equal to an allowable power level which is determined based on at least one of a radio frequency (RF) exposure limit, a target margin to the RF exposure limit or a measured specific absorption limit (SAR) value for the first transmitter unit. Further, according to an aspect an apparatus for wireless communications is provided. The apparatus includes a module adapted to (1) identify a first power level for a first transmitter unit; and (2) dynamically select at least one of a second power level or an active time period for the first transmitter unit based on the first power level, wherein an average power used by the first transmitter unit for a period of time is less than or equal to an allowable power level which is determined based on at least one of a radio frequency (RF) exposure limit, a target margin to the RF exposure limit or a measured specific absorption limit (SAR) value for the first transmitter unit. In this manner, the present methods and apparatus may employ transmit power history of one or more transmitters in to ensure compliance (e.g., over a period of time) of a device including such one or more transmitters.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
   identifying a first transmitter power level for a first transmitter unit to transmit signals over a wireless network;
   selecting a transmitter power back-off value for a second transmitter unit, from a look-up table (LUT) including a plurality of predetermined back-off values for the second transmitter unit, each of the predetermined back-off values associated with a transmitter power level or a range of transmitter power levels for the first transmitter unit, wherein:
      the selecting comprises selecting the transmitter power back-off value for the second transmitter unit in the LUT corresponding to the identified first transmitter power level for the first transmitter unit; and
      the first and the second transmitter units operate near simultaneously using one or more transmit antennas; and
   adjusting a transmitter power level of the second transmitter unit to transmit signals over a wireless network by applying the selected transmitter power back-off value, wherein a total of the transmitter power levels of the first and the second transmitter units is less than or equal to an allowable total transmitter power level based on a radio frequency (RF) exposure limit.

2. The method of claim 1, wherein the transmitter power levels or range of transmitter power levels for the first transmitter unit in the LUTs are further associated with a plurality of predetermined transmitter power back-off values for a third transmitter unit, and wherein the second transmitter unit and the third transmitter unit transmit using with a different transmission frequency.

3. The method of claim 2, further comprising:
   selecting at least a second transmitter power back-off value for at least the third transmitter unit from the LUT corresponding to the first transmitter power level, wherein the first, second, and third transmitter units operate near simultaneously using one or more transmit antennas; and
   adjusting at least a transmitter power level of at least the third transmitter unit based on at by applying the selected second transmitter power back-off value, wherein a total of the transmitter power levels of the first, second, and third transmitter units is less than or equal to the allowable total transmitter power level.

4. The method of claim 1, wherein the second transmitter unit is associated with a lower priority than the first transmitter unit.

5. The method of claim 4, further comprising:
   determining the priority of the first and the second transmitter units based on one or more of data priorities, available frequency bands, load of a network, radio frequency conditions, available technologies, and cost of data connection.

6. The method of claim 1, wherein the first and the second transmitter units are located on different apparatuses.

7. An apparatus for wireless communications, comprising:
   means for identifying a first transmitter power level for a first transmitter unit to transmit signals over a wireless network;
   means for selecting a transmitter power back-off value for a second transmitter unit, from a look-up table (LUT) including a plurality of predetermined back-off values for the second transmitter unit, each of the predetermined back-off values associated with a transmitter power level or a range of transmitter power levels for the first transmitter unit, wherein:
      the selecting comprises selecting the transmitter power back-off value for the second transmitter unit in the LUT corresponding to the identified first transmitter power level for the first transmitter unit; and
      the first and the second transmitter units operate near simultaneously using one or more transmit antennas; and
   means for adjusting a transmitter power level of the second transmitter unit to transmit signals over a wireless network by applying the selected transmitter power back-off value, wherein a total of the transmitter power levels of the first and the second transmitter units is less than or equal to an allowable total transmitter power level based on a radio frequency (RF) exposure limit.

8. The apparatus of claim 7, wherein the transmitter power levels or range of transmitter power levels for the first transmitter unit in the LUTs are further associated with a plurality of-predetermined transmitter power back-off values for a third transmitter unit, and wherein the second transmitter unit and the third transmitter unit transmit using with a different transmission frequency.

9. The apparatus of claim 8, further comprising:
   means for selecting at least a second transmitter power back-off value for at least the third transmitter unit from the LUT corresponding to the first transmitter power level, wherein the first, second, and third transmitter units operate near simultaneously using one or more transmit antennas; and
   means for adjusting at least a transmitter power level of at least the third transmitter unit based on at by applying the selected second transmitter power back-off value, wherein a total of the transmitter power levels of the first, second, and third transmitter units is less than or equal to the allowable total transmitter power level.

10. The apparatus of claim 7, wherein the second transmitter unit is associated with a lower priority than the first transmitter unit.

11. The apparatus of claim 10, further comprising:
means for determining priority of the first and the second transmitter units based on one or more of data priorities, available frequency bands, load of a network, radio frequency conditions, available technologies, and cost of data connection.

12. The apparatus of claim 7, wherein the first and the second transmitter units are located on different apparatuses.

13. An apparatus for wireless communications, comprising:
at least one processor coupled with a memory and configured to:
identify a first transmitter power level for a first transmitter unit to transmit signals over a wireless network;
select a transmitter power back-off value for a second transmitter unit, from a look-up table (LUT) including a plurality of predetermined back-off values for the second transmitter unit, each of the predetermined back-off values associated with a transmitter power level or a range of transmitter power levels for the first transmitter unit, wherein:
the selecting comprises selecting the transmitter power back-off value for the second transmitter unit in the LUT corresponding to the identified first transmitter power level for the first transmitter unit; and
the first and the second transmitter units operate near simultaneously using one or more transmit antennas; and
adjust a transmitter power level of the second transmitter unit to transmit signals over a wireless network by applying the selected transmitter power back-off value, wherein a total of the transmitter power levels of the first and the second transmitter units is less than or equal to an allowable total transmitter power level based on a radio frequency (RF) exposure limit.

14. The apparatus of claim 13, wherein the transmitter power levels or range of transmitter power levels for the first transmitter unit in the LUTs are further associated with a plurality of-predetermined transmitter power back-off values for a third transmitter unit, and wherein the second transmitter unit and the third transmitter unit transmit using with a different transmission frequency.

15. The apparatus of claim 14, wherein the at least one processor is configured to:
select at least a second transmitter power back-off value for at least the third transmitter unit from the LUT corresponding to the first transmitter power level, wherein the first, second, and third transmitter units operate near simultaneously using one or more transmit antennas; and
adjust at least a transmitter power level of at least the third transmitter unit based on at by applying the selected second transmitter power back-off value, wherein a total of the transmitter power levels of the first, second, and third transmitter units is less than or equal to the allowable total transmitter power level.

16. The apparatus of claim 13, wherein the second transmitter unit is associated with a lower priority than the first transmitter unit.

17. The apparatus of claim 16, further comprising:
determining priority of the first and the second transmitter units based on one or more of data priorities, available frequency bands, load of a network, radio frequency conditions, available technologies, and cost of data connection.

18. The apparatus of claim 13, wherein the first and the second transmitter units are located on different apparatuses.

19. A non-transitory computer readable medium having computer executable code stored thereon for wireless communication, comprising:
code for identifying a first transmitter power level for a first transmitter unit to transmit a signal over a wireless network;
code for selecting a transmitter power back-off value for a second transmitter unit, from a look-up table (LUT) including a plurality of predetermined back-off values for the second transmitter unit, each of the predetermined back-off values associated with a transmitter power level or a range of transmitter power levels for the first transmitter unit, wherein:
the selecting comprises selecting the transmitter power back-off value for the second transmitter unit in the LUT corresponding to the identified first transmitter power level for the first transmitter unit; and
the first and the second transmitter units operate near simultaneously using one or more transmit antennas; and
code for adjusting a transmitter power level of the second transmitter unit to transmit signals over a wireless network by applying the selected transmitter power back-off value, wherein a total of the transmitter power levels of the first and the second transmitter units is less than or equal to an allowable total transmitter power level based on a radio frequency (RF) exposure limit.

20. The non-transitory computer readable medium of claim 19, wherein the transmitter power levels or range of transmitter power levels for the first transmitter unit in the LUTs are further associated with a plurality of-predetermined transmitter power back-off values for a third transmitter unit, and wherein the second transmitter unit and the third transmitter unit transmit using with a different transmission frequency.

21. The non-transitory computer readable medium of claim 19, wherein the second transmitter unit is associated with a lower priority than the first transmitter unit.

22. The non-transitory computer readable medium of claim 21, further comprising:
code for determining priority of the first and the second transmitter units based on one or more of data priorities, available frequency bands, load of a network, radio frequency conditions, available technologies, and cost of data connection.

* * * * *